H. B. & H. T. Lawton.
Cotton Batting.
Nº 6,189.    Patented Mar. 13, 1849.
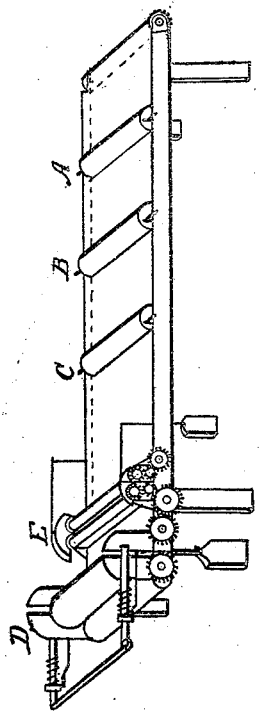

UNITED STATES PATENT OFFICE.

H. B. LAWTON, OF COHOES, AND H. T. LAWTON, OF TROY, NEW YORK.

COTTON BATTING.

Specification forming part of Letters Patent No. 6,189, dated March 13, 1849; Reissued June 22, 1852, No. 219.

*To all whom it may concern:*

Be it known that we, HAMILTON B. LAWTON, of Cohoes, and HIRAM T. LAWTON, of the city of Troy, in the State of New York, have invented a new and Improved Method of Preparing Cotton for Batting; and we do hereby declare that the following is a full and exact description of the same, reference being had to the annexed drawing, making a part of this specification.

Figure 1 represents an endless apron with a set of pressing rollers attached at E. A is a thin sheet of cotton that is carded and rolled up in the manner of preparing cotton for wadding, and is laid upon the apron. B, represents the batting which has been merely well picked and spread in a lapper, in the manner of preparing cotton for carding; and is laid upon the sheet of cotton that comes from the roll A. C, is a second sheet or layer of carded cotton of the same as A, and is laid upon the batting B. The whole is carried forward by the revolving motion of the apron through the pressing rollers E, and is rolled up at D, making a combination of carded and uncarded cotton for batting of any required length or thickness.

The advantages of this mode is in rendering cotton batting that has been merely well picked and spread in a lapper smooth upon its surfaces; thereby preventing it from sticking and reuniting together when packed and pressed in bales and bundles. 2nd in making it stronger and more durable while in use, and 3rd in shortening the process and reducing the expense of preparing cotton for bedding, mattresses &c.

Be it distinctly known that we do not claim as our invention the mode of operating a series of carding machines the one before the other to make batting as shown by G. Essex's drawing, nor any part of the above described machine.

What we claim as our invention and discovery is—

The method of laying on and covering the entire upper and lower surfaces of cotton batting that has been merely well picked and spread in a lapper, with a thin sheet or layer of carded cotton, for the purpose of making it smooth and strong thereby fitting it for being packed and pressed and used for batting purposes, such as beds mattresses, &c.

H. B. LAWTON.
HIRAM T. LAWTON.

Witnesses:
WM. R. WATSON,
A. J. BALLARD.

[FIRST PRINTED 1913.]